United States Patent [19]
Viot

[11] Patent Number: 5,784,534
[45] Date of Patent: Jul. 21, 1998

[54] CIRCUIT AND METHOD FOR REPRESENTING FUZZY RULE WEIGHTS DURING A FUZZY LOGIC OPERATION

[75] Inventor: J. Greg Viot, Austin, Tex.

[73] Assignee: Motorola, Inc., Schaumburg, Ill.

[21] Appl. No.: 414,817

[22] Filed: Mar. 31, 1995

[51] Int. Cl.$^6$ .................................. G06F 15/18
[52] U.S. Cl. ................................................ 395/3
[58] Field of Search ........................ 395/3, 11, 51, 395/76, 375, 400; 368/113; 321/22.3

[56] References Cited

U.S. PATENT DOCUMENTS

| | | | |
|---|---|---|---|
| 5,193,144 | 3/1993 | Tsutsumi et al. | 395/76 |
| 5,263,125 | 11/1993 | Viot et al. | 395/51 |
| 5,295,226 | 3/1994 | Yamakawa | 395/3 |
| 5,325,341 | 6/1994 | Viot et al. | 368/113 |
| 5,371,832 | 12/1994 | Eichfeld et al. | 395/3 |
| 5,386,534 | 1/1995 | Sibigtroth et al. | 395/400 |
| 5,416,783 | 5/1995 | Borseghini et al. | 371/22.3 |
| 5,432,885 | 7/1995 | Nomoto et al. | 395/3 |
| 5,475,822 | 12/1995 | Sibigtroth et al. | 395/375 |
| 5,487,130 | 1/1996 | Ichimori et al. | 395/3 |
| 5,579,439 | 11/1996 | Khan | 395/11 |

OTHER PUBLICATIONS

Sibigtroth, James M., "Implementing Fuzzy Expert Rules in Hardware," AI Expert, Apr. 1992, vol. 7, No. 4, pp. 25–31.
Genther et al., Rule weight generation for a fuzzy classification system based on fuzzy clustering methods, Proceedings of the third IEEE conference on fuzzy systems, pp. 614–617 Jun. 29, 1994.
Cox, Adaptive fuzzy systems, IEEE Spectrum, pp. 27–31 Feb. 1993.
Yeung et al., A weighted fuzzy production rule evaluation method., 1995 IEEE International conference on fuzzy systems, pp. 461–468 Mar. 24, 1995.
Chen, A new methodology for fuzzy control based on weighted fuzzy logics, TENCON 93, pp. 282–286 Oct. 21, 1993.

*Primary Examiner*—Robert W. Downs
*Assistant Examiner*—Sanjiu Shah

[57] ABSTRACT

A circuit (14) to evaluate fuzzy logic rules in a data processor (10) incorporates fuzzy rule weights. A rule strength is stored in a first register (220), while a weight value is stored in a second register (222) in a processor (10). The circuit (14) adds 1 to the weight value before multiplying with the rule value. The product is truncated to produce the weighted rule strength. In the execution unit (14), the rule value is initially applied to one adder (204) input (208), while a bit of the weight value is monitored to determine whether the rule value or 0-bits are inputted to the other adder (204) input (206) which adds the inputs to produce a partial product, which is then fed back to an adder (204) input for the next process cycle wherein the next bit of the weight value is monitored.

12 Claims, 6 Drawing Sheets

FIG. 2 -PRIOR ART-

CIRCUIT AND METHOD FOR REPRESENTING FUZZY RULE WEIGHTS DURING A FUZZY LOGIC OPERATION

REFERENCE TO RELATED APPLICATION

The present application is related to the following U.S. patent application:

"A Circuit And Method For Evaluating Fuzzy Logic Rules", invented by J. Greg Viot et al., having U.S. Pat. No. 5,263,125, assigned to the assignee hereof, which is hereby expressly incorporated by reference.

FIELD OF THE INVENTION

This invention relates generally to a data processing system, and more particularly to execution of a fuzzy logic operation in a data processing system.

BACKGROUND OF THE INVENTION

Data processors have been developed to function as binary machines whose inputs and outputs are either interpreted as ones or zeroes, and no other possibilities may exist. While this works well in most situations, sometimes an answer is not simply "yes" or "no," but something in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "temperature is warm," into a value that typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labeled "cool" and "warm." Further processing would then be required to determine a degree of membership in each of the membership functions (i.e., if the input temperature fits into each of the membership sets, cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception which is not generally limited to an environment of absolute truths. After the fuzzification step, a rule evaluation step is executed. During execution of the rule evaluation step, a technique referred to as "min-max" inference is used to calculate numerical conclusions to linguistic rules defined by a user. Conclusions from the rule evaluation step are referred to as "fuzzy outputs" and may be true to varying degrees. Thus, competing results may be produced. A last step in the fuzzy logic process is referred to as "defuzzification." As the name implies, defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April, 1992 issue of AI EXPERT on pages 25 through 31 and is hereby incorporated by reference herein.

Often, there may be a desire to implement a rule evaluation instruction within a fuzzy logic operation that is capable of evaluating a "weighted" fuzzy rule base. In such a weighted fuzzy rule base, each rule strength has an associated weight value. During rule evaluation, a rule strength is computed based on the rule strength's antecedents. Then, if weights are used, the rule strength is multiplied by the rule strength's assigned weight value before being compared, and possibly written, to fuzzy output memory.

In such an implementation, generally both the rule strength and the rule weight are 8-bit values. A multiplication of these two values (the multiplicand and multiplier), as required to implement a weighted rule strength, results in a 16-bit value, which is not within the 8-bit range desired.

Thus, there is a need in the art for a system and method for implementing a weighted rule base within a fuzzy logic operation, wherein the resultant products are of the same bit size as the multiplicand and multiplier.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
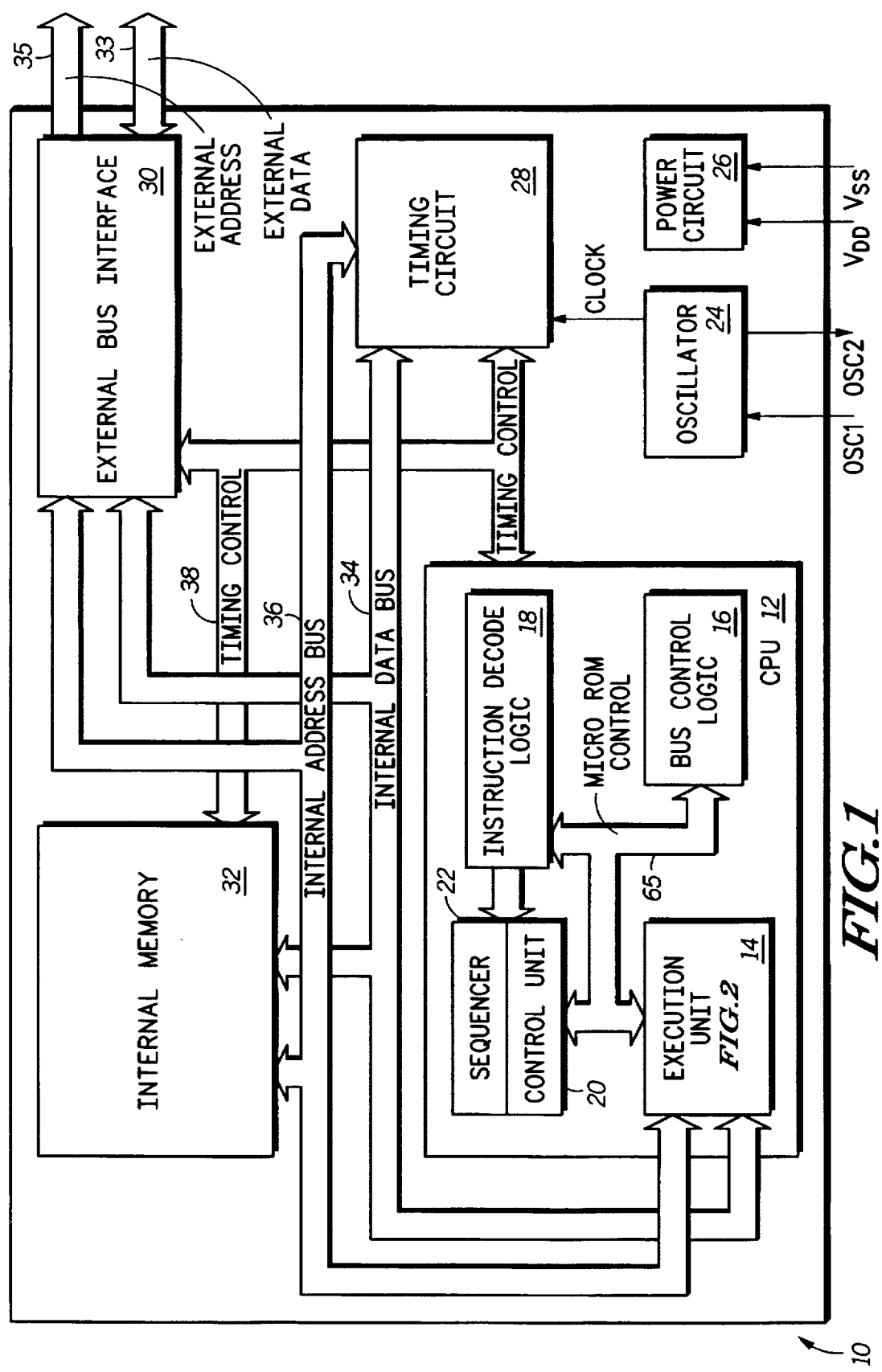
FIG. 1 illustrates a processor for implementing one embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or a register bit into its inactive, or logically false state. Additionally, a hexadecimal value may be indicated by a "$" symbol proceeding a value. Further, in the following discussion, N refers to a positive integer.

Refer now to the drawings wherein depicted elements are not necessarily shown to scale and wherein like or similar elements are designated by the same reference numeral through the several views.

FIG. 1 shows a processor 10 (processor 10 could also be referred to as a data processing system) in which the fuzzification instruction of the present invention may be implemented. Processor 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal (not shown). The crystal is connected between the Osc 1 and Osc 2 signals to enable the crystal to oscillate. The Osc 1 provides a "Clock" signal to a remaining portion of processor 10. Operation of a crystal oscillator is well known in the data processing art and should be apparent to one with ordinary skill in the art.

Similarly, power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of processor 10. The routing of these signals is well known in data processing art and should be obvious to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 via an External Address bus 35. Similarly, a plurality of data values are communicated to/from external bus interface 30 via an External Data bus 33. External bus interface 30 functions to communicate address and data values between an external user and processor 10. External bus interface 30 provides a plurality of address and data values to/from a remaining portion of processor 10 via an Internal Address bus 36 and an Internal Data bus 34, respectively. Internal memory 32 functions to store information values necessary for the proper operation of processor 10. Additionally, other data values may be stored therein if specified in a user program provided via Internal Address bus 36 and Internal Data bus 34.

CPU 12 executes each of the instructions required during operation of processor 10. Internal Address bus 36 and Internal Data bus 34 communicate information between execution unit 14 and a remaining portion of processor 10. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of processor 10. Additionally, control unit 20 includes a Micro-ROM memory (not shown) which provides a plurality of control information to each of execution unit 14, bus control logic 16, and instruction decode logic 18 via a Micro-ROM Control Bus 65.

Figure 6:
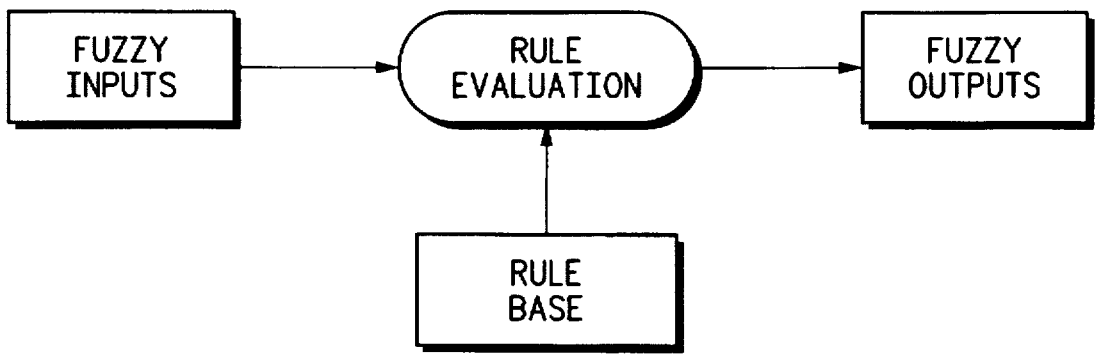
FIG. 6 illustrates a portion of a fuzzy logic system.
Figure 7:
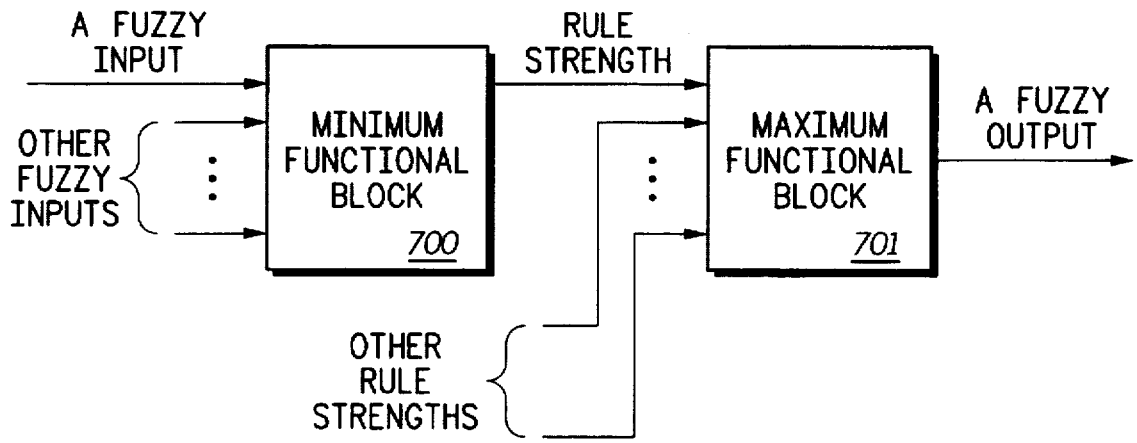
FIG. 7 illustrates a connection path within a fuzzy logic system.

As illustrated in FIG. 6, the rule evaluation process can be viewed as a transformation of fuzzy inputs to fuzzy outputs. The rules and the rulebase specify which fuzzy inputs combine to form which fuzzy outputs. A typical method of rule evaluation is the min/max method of rule evaluation, which is illustrated in FIG. 7. A fuzzy input entering a MIN functional block 700 is evaluated with other fuzzy inputs to determine a rule strength. The rule strength will take on the minimum of the various fuzzy inputs entering the MIN functional block 700. The rule strength is then passed to a MAX functional block 701 where it is evaluated with other rule strengths to form a fuzzy output. The fuzzy output will take on a maximum value of the various rule strengths entering the MAX functional block 701.

Each rule in a fuzzy rulebase implies connections between certain fuzzy inputs and certain fuzzy outputs. Connections may be implemented in hardware, software, or some combination of both. Adaptive systems may permit connections to change during the operational life of the fuzzy system.

During a rule evaluation process, weighting of rule strengths provides for an ability to turn a rule strength off with a weight of 0, to turn a rule strength completely on with a weight of 1, or to alter the relative influence of a particular rule strength by varying the weight from 0 to 1. A rule weight could be fixed within the implementation or could be adaptive based on the state of the system at a certain instance.

Rules in fuzzy logic have the general form:

IF (fuzzy input 1 and fuzzy input 2 and . . . ) THEN (fuzzy output 1 and fuzzy output 2 and . . . ) and rule strengths (rs) are evaluated as:

rs=min (fuzzy input 1, fuzzy input 2, . . . )

For a further discussion of evaluating fuzzy logic rules, please refer to U.S. Pat. No. 5,263,125, which has been incorporated by reference herein above.

As noted above, it is often desirable to weight a particular rule strength from 0.0 to 1.0, inclusive. In an 8-bit system, these weights are represented with values $00 to $FF. To implement a weighted rule strength, the rule strength and the weight are multiplied to produce a product. However, the product of an 8-bit rule strength and an 8-bit weight is a 16-bit value, which is not within the 8-bit range desired within the implementation.

One solution is to merely truncate the lower 8 bits of the 16-bit product. However, such a solution results in inaccuracies and degradation of the rule strength, which are compounded when rules are cascaded within an implementation.

For example, for a rule strength of $FF and a weight of $FF, the resultant product is $FE01. If the lower 8-bits are truncated, the result is $FE, which is not exactly the desired result of $FF.

The unique solution of the present invention for solving this problem is to effectively add 1 to the weight before multiplying it by the rule strength and truncating the product. As a result, if the weight is stored as 0 (w=0), then effectively multiplying w+1 (i.e., 0+1) by any rule strength (rs) still yields 0 after truncation of the product. For example, if rs=$FF and w=$00, then result=$FF*($00+1)=$00FF=$00 (by truncating the lower 8 bits).

If the weight is stored as a maximum (w=$FF), then multiplying w+1 (i.e., $FF+1) by any rule strength yields that rule strength (unchanged). For example, if rs=$FF and w=$FF, then result=$FF*($FF+1)=$FF00=$FF (by truncating the lower 8 bits).

In order to implement rs*(w+1) without imparting a performance penalty associated with increasing the bit size and thus the circuitry area of a multiplier, the implementation may be slightly altered by modifying the multiply algorithm so that the initial partial product is set to the rule strength, instead of 0: rs*(w+1)=(rs*w)+rs. This eliminates the overhead of incrementing w by 1 and processing an extra multiplier bit.

Figure 2:
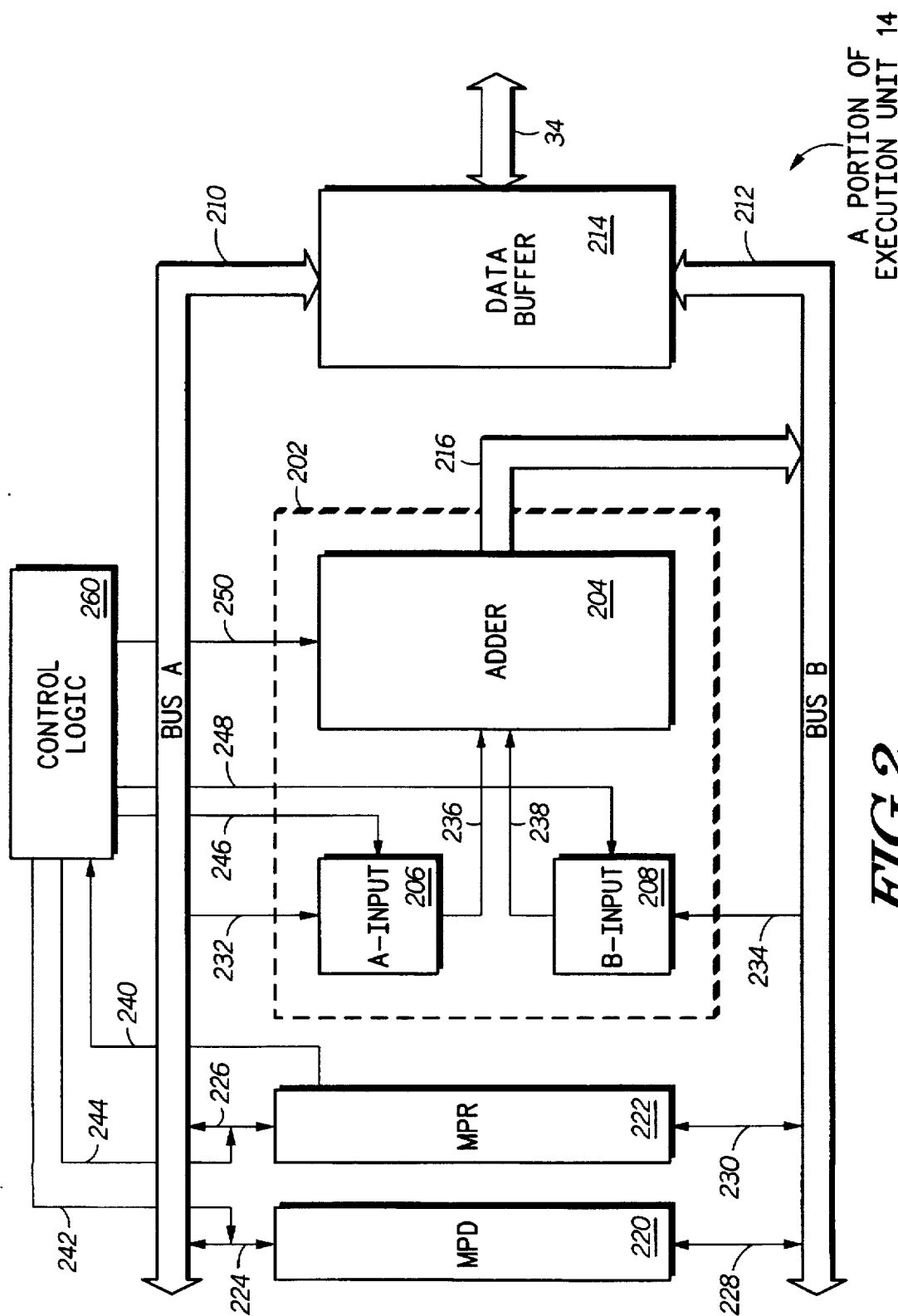
FIG. 2 illustrates a more detailed diagram of a portion of the execution unit of the processor illustrated in FIG. 1.

The present invention implements the above in execution unit 14, which is illustrated in greater detail in FIG. 2. Execution unit 14 generally includes data buffer 214 coupled to other circuitry within system 10 through internal data bus 34. Data buffer 214 is also coupled to Bus A 210 and Bus B 212. Arithmetic logic unit (ALU) 202 comprises adder circuit 204 and A-Input multiplexor 206 and B-Input multiplexor 208 coupled via buses 236 and 238, respectively, to adder 204. A-Input multiplexor 206 is coupled to Bus A 210 through bus 232, while B-Input multiplexor 208 is coupled to Bus B 212 through bus 234.

Execution unit 14 also includes registers 220 and 222. Register 220 is coupled to Bus A 210 through bi-directional bus 224, while register 220 is coupled to Bus B 212 through bidirectional bus 228. Likewise, register 222 is coupled to Bus A 210 through bi-directional bus 226 while being coupled to Bus B 212 through bus 230. Control logic circuitry 260 provides and receives control signals to/from various ones of the aforementioned elements through control lines 240, 242, 244, 246, 248 and 250 as illustrated in FIG. 2.

Figure 3:
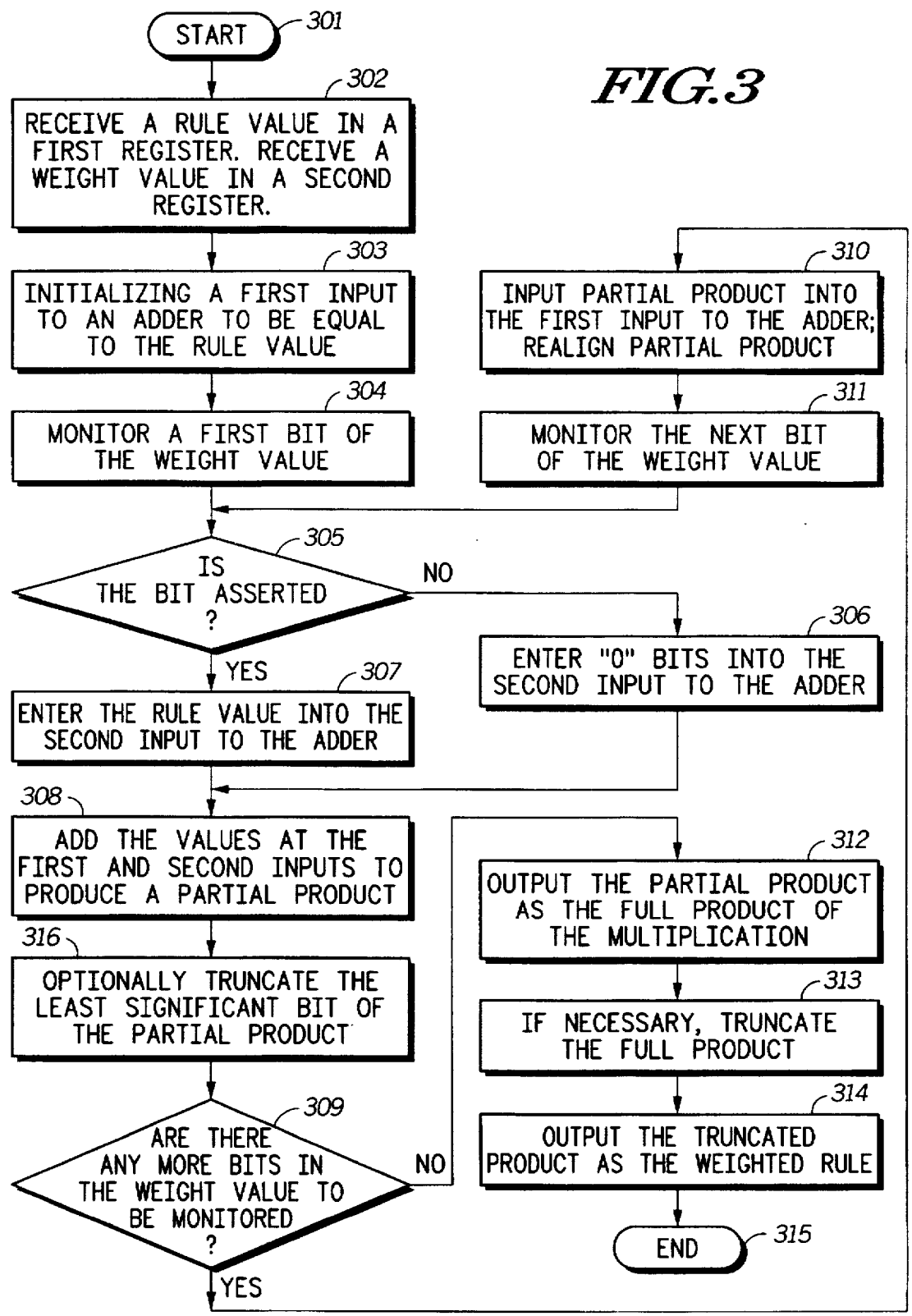
FIG. 3 illustrates a flow diagram of one embodiment of the present invention.

The following discussion describes the process of one embodiment of the present invention as illustrated in FIG. 3 and as implemented in execution unit 14 illustrated in FIGS. 1 and 2. Note that in this embodiment, a multiply operation is performed by a series of shift and add operations, each of which produces a partial product. The full product equals the final partial product. Control logic circuitry 260 may perform the control operations in order to implement the flow process illustrated in FIG. 3.

The process begins at step 301. A rule value (rule strength) has been determined as discussed above. In one embodiment of the present invention, the rule value is transferred to execution unit 14 via internal data bus 34 wherein it is temporarily stored within data buffer 214. Then, through either Bus A 210 or Bus B 212, the rule value is transferred and stored in register 220 (step 302). The rule value will also be referred to hereinafter as the multiplicand.

A weight value is transferred to register 222 in the same manner as the rule value (step 302) and will also be referred to hereinafter as the multiplier.

As noted above, the present invention provides an initial partial product equal to the rule strength, i.e. the rule value received and stored in register 220. This is performed by control logic 260 transferring a copy of the rule value from register 220 through buses 228, 212 and 234 to the B-Input multiplexor 208 (step 303). Thereafter, in step 304, control logic 260 then monitors the least significant bit of the multiplier, i.e. the weight value, stored in register 222 via control line 240. In step 305, a determination is made by control logic 260 whether or not the least significant bit of the multiplier is asserted. If the least significant bit of the multiplier is asserted, control logic 260, via control line 242 coupled to bidirectional bus 224, causes a copy of the multiplicand, i.e. the rule value, to be transferred via bi-directional bus 224, Bus A 210 and bus 232 to A-Input multiplexor 206 (step 307). Then, via control lines 246 and 248, control logic 260 inputs the rule value stored in A-Input multiplexor 206 and in B-Input multiplexor 208 via buses 236 and 238, respectively, into adder 204, which adds the values (step 308).

If in step 305 control line 240 monitors the least significant bit of the weight value to be negated, then control logic 260 causes, via control line 246, A-Input multiplexor 206 to input into adder 204 via bus 236 a set of eight zeros, instead of the 8-bit rule value from register 220 (step 306). These eight zeros will then be added to the 8-bit rule value temporarily stored in multiplexor 208 (step 308).

In step 309, control logic 260 determines whether or not there are any more bits in the weight value to be monitored. If yes, then in step 310, the resultant partial product is outputted from adder 204 via bus 216 to Bus B 212 for feedback to B-Input multiplexor 208 via bus 234. Then, in step 311, the next bit of the weight value is monitored by control logic 260. The procedure described above in steps 305–309 is again repeated and adder 204 adds the value set in A-Input multiplexor 206 with the partial product temporarily stored in B-Input multiplexor 208.

Each time the partial product is fed back to B-Input multiplexor 208 (step 310), the partial product is realigned by B-Input multiplexor 208 before transferring to adder 204 via bus 238. This realignment effectively shifts the partial product so that the next least significant bit becomes the least significant bit. The former least significant bit is not kept. Therefore, each pass through adder 204 causes a 1-bit truncation, and after 8 passes through adder 204, the 8 lower bits of the product have been truncated.

This process continues until all of the bits of the weight value have been monitored by control logic 260. If in step 309, it is determined that all bits of the weight value have been monitored, then the product produced by adder 204 and outputted via bus 216 is the full product (step 312). This full product will be an 8-bit value if the rule value and the weight value were 8-bit values.

If in the above described realignments, or shifts, of the partial products in B-Input multiplexor 208 (step 310), the least significant bits are not discarded, then they may be stored in a register (not shown), and then step 313 may be performed to truncate the resulting 16-bit full product to an 8-bit value. Optionally, step 316 may be performed to truncate the least significant bit of the partial product produced by step 308 through each iteration of the process.

The truncated full product value, also referred to as the truncated product value, is then further utilized as described above in the rule evaluation process within processor 10.

Figure 5:
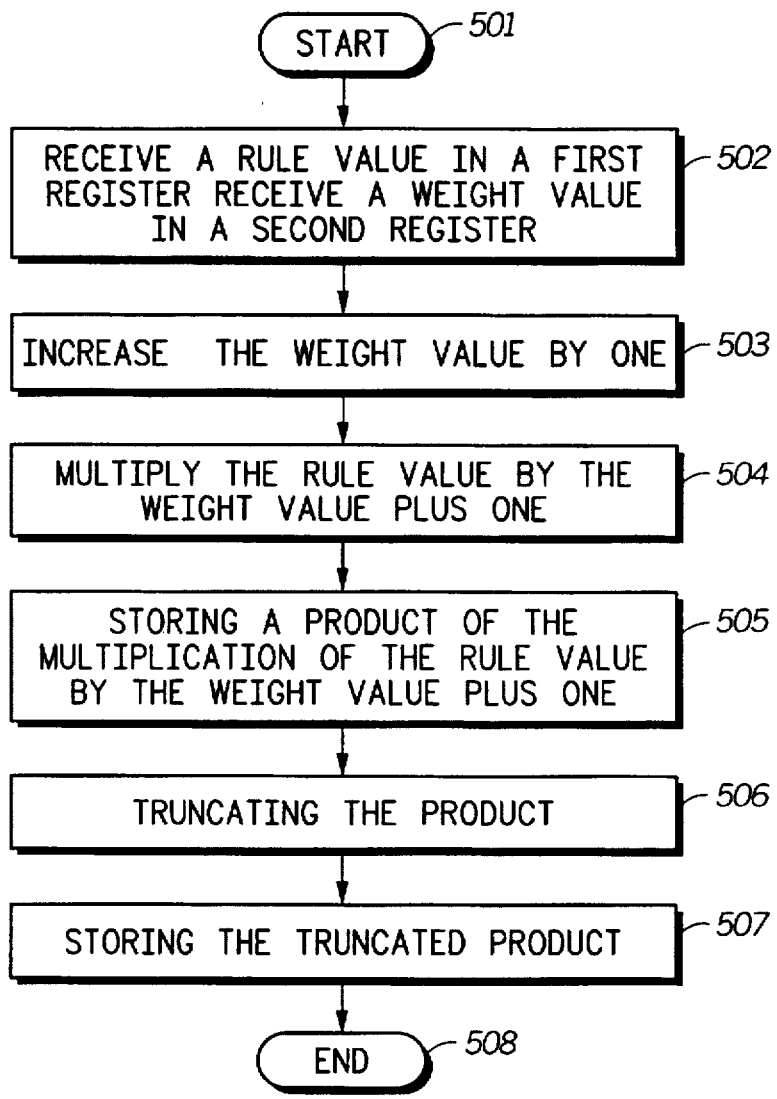
FIG. 5 illustrates a flow diagram of another embodiment of the present invention.
Figure 8:
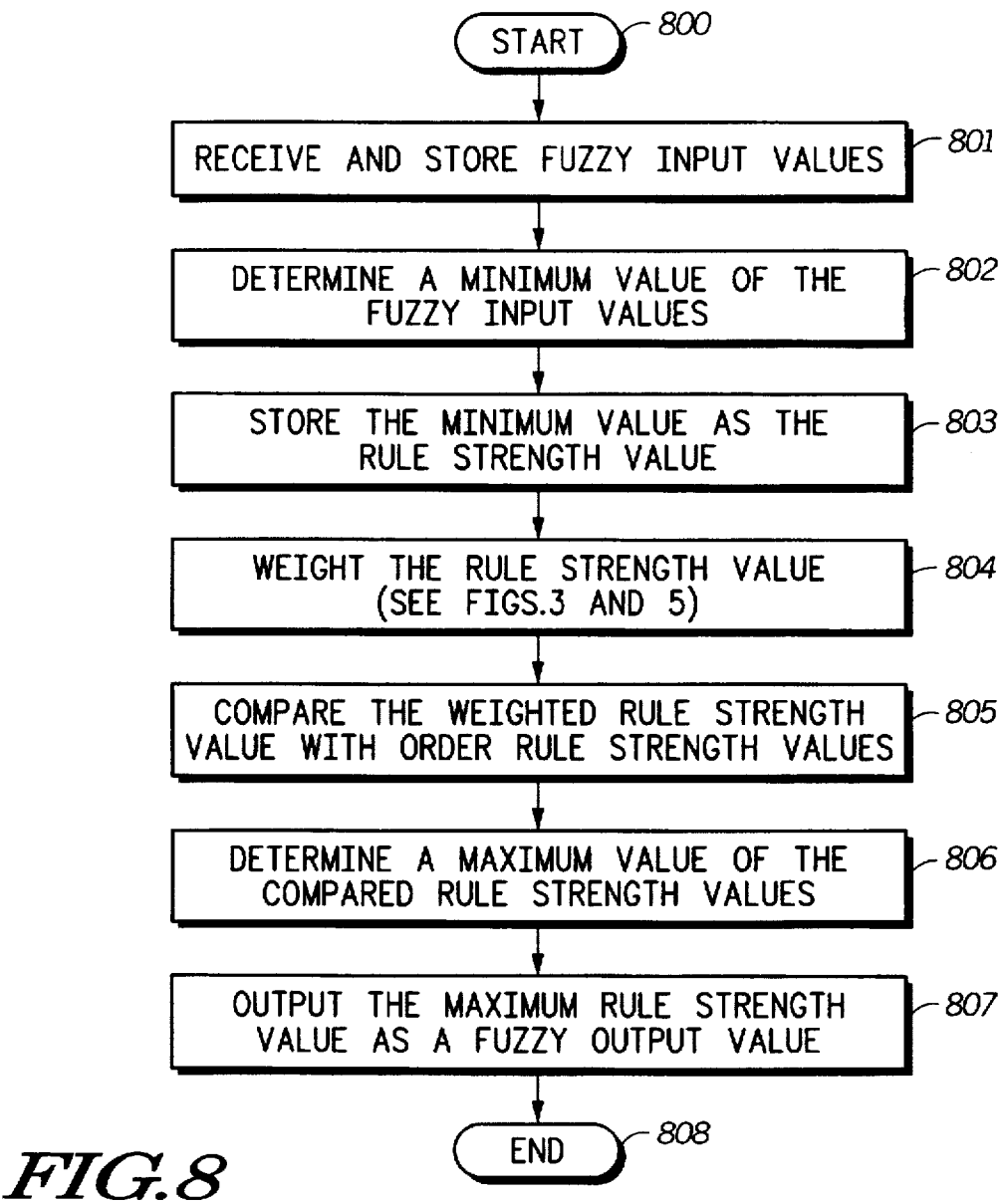
FIG. 8 illustrates a flow diagram of a rule evaluation process employing weighting of rule strengths.

Referring next to FIG. 8, there is illustrated a flow diagram of a rule evaluation process employing the weighting of rule strengths as described above with respect to FIGS. 3 and 5. The process begins at step 800 and proceeds to step 801, wherein a plurality of fuzzy input values, produced by a fuzzification process, are received by processor 10 and stored within internal memory 32. Thereafter, in step 802, the minimum value of these fuzzy input values is determined by CPU 12 (also refer to block 700 in FIG. 7). Next, in step 803, the determined minimum value is stored within internal memory 32 as a rule strength value.

Next, in step 804, the rule strength value is retrieved from internal memory 32 and supplied by internal data bus 34 to execution unit 14 of CPU 12. A weighting of this rule strength value is then performed, as discussed with respect to FIGS. 3 and 5 above.

The resulting weighted rule strength value is then outputted from CPU 12 and stored in internal memory 32. CPU 12 will then compare this weighted rule strength value with other rule strength values also stored within internal memory 32. In step 806, CPU 12 determines the maximum value of these compared rule strength values (also refer to block 701 in FIG. 7).

Next, in step 807, the resulting maximum rule strength value is outputted as a fuzzy output value from processor 10. The process then ends at step 808.

Figure 4:
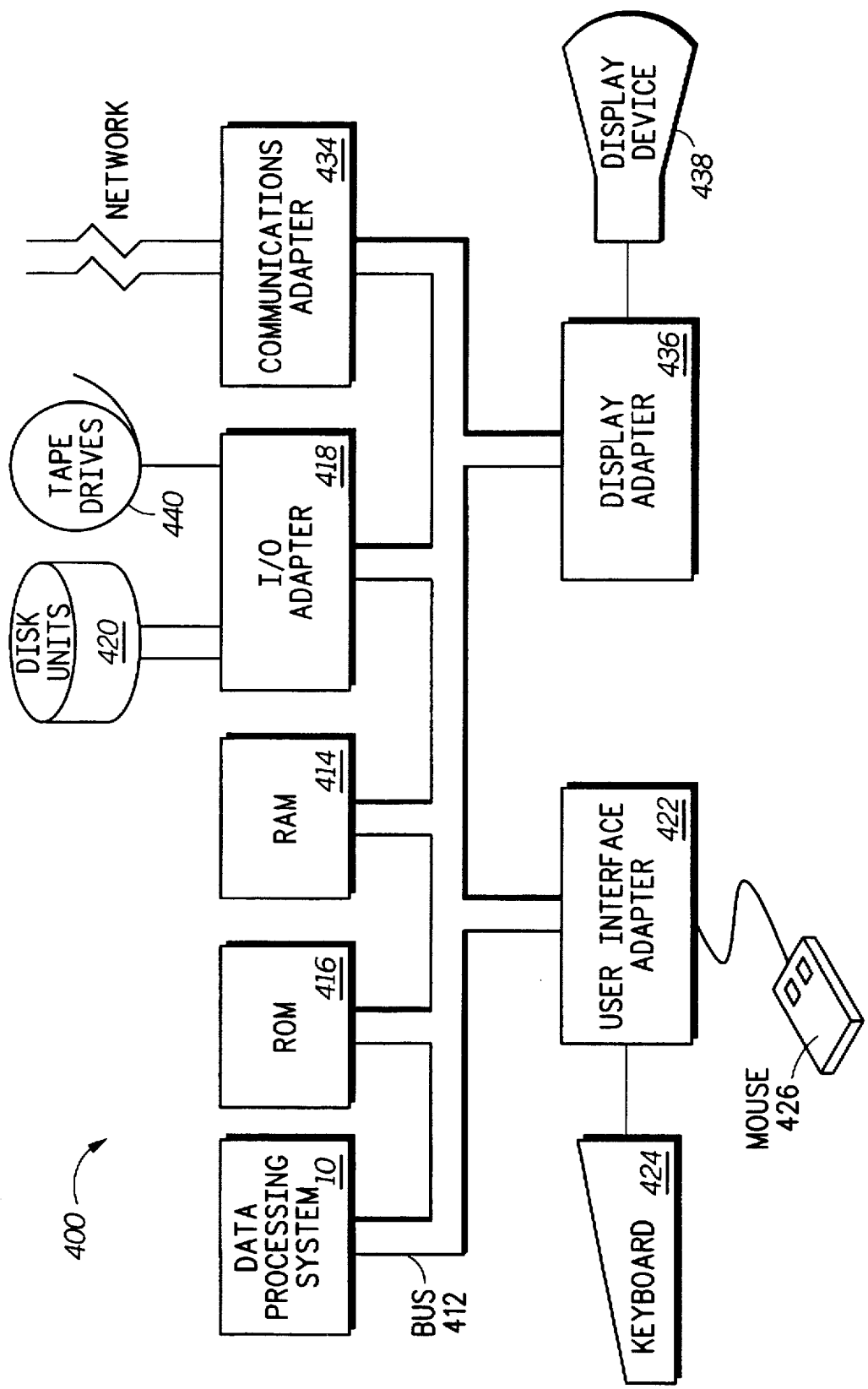
FIG. 4 illustrates a computer system using the processor illustrated in FIG. 1.

Processor 10 may be implemented within computer system 400 as depicted in FIG. 4.

FIG. 4 illustrates a typical hardware configuration of a workstation in accordance with the subject invention having processor 10 (see FIG. 1), and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

I claim:

1. A method implemented in a data processing system for rule weighting in a fuzzy rule evaluation operation, said method comprising the steps of:

(a) receiving and storing a first rule value in a first register;

(b) receiving and storing a first weight value in a second register, wherein said first weight value is associated with said first rule value;

(c) increasing said first weight value, wherein the increased first weight valve is a first multiplicand;

(d) multiplying said first rule value with the first multiplicand, wherein said increasing and multiplying steps are implemented within a same circuit;

(e) storing a first product of said multiplying step;

(f) truncating said first product to produce a first truncated product; and (g) storing said first truncated product, wherein said first truncated product is a first rule strength associated with said first rule value.

2. A method as in claim 1, wherein said first rule value is an N-bit value and said firs weight value is an N-bit value and said first truncated product is an N-bit value.

3. A method as in claim 1, further comprising the steps of, receiving and storing a plurality of fuzzy input values;

determining a minimum value of said plurality of fuzzy input values; and storing said minimum value as said first rule value.

4. A method as in claim 1, wherein steps (a)–(g) are performed in a processor in said data processing system.

5. A method as in claim 3, further comprising the steps of:

comparing said first truncated product to one or more other rule values;

determining a maximum value of said first truncated product and said one or more other rule values; and outputting said maximum value as a fuzzy output value.

6. A method as in claim 1, wherein the steps of increasing and multiplying comprise the steps of:

setting a first input to the arithmetic circuit to be equal to said first rule value;

monitoring a first bit of said first weight value;

inputting said first rule value to a second input of the arithmetic circuit if the first bit of said first weight value is asserted; and clearing the second input of the arithmetic circuit if the first bit of said first weight value is negated;

producing a first partial output value from the arithmetic circuit based on the first and second inputs; and inputting the first partial output to the first input of the arithmetic circuit if there remains any bit in said first weight value to be monitored.

7. A method as in claim 6, wherein the steps of increasing and multiplying further comprise the steps of:

monitoring a second bit of said first weight value;

inputting said first rule value to the second input of the arithmetic circuit if the first bit of said first weight value is asserted; and clearing the second input of the arithmetic circuit if the second bit of said first weight value is negated;

producing a second partial output value from the arithmetic circuit based on the first and second inputs; and inputting the second partial output to the first input of the arithmetic circuit if there remains any bit in said first weight value to be monitored.

8. A method as in claim 6, wherein the steps of increasing and multiplying further comprise the step of:

providing the first partial output as the first product if there remain no bits in said first weight value to be monitored.

9. A data processor, the data processor for performing rule weighting in a fuzzy rule evaluation operation, the data processor comprising:

a first memory storage unit for storing a first rule strength value, "$rs_i$"

a second memory storage unit for storing a first weight value, "$w_i$", associated with the first rule strength value;

means for increasing the first weight value, where the first weight value is a first multiplicand; and means for calculating a first product of the first rule strength and the increased first weight value, the first product is calculated as, $$\text{first product} = rs_i {}^* (1+w_i); \text{ and}$$

wherein the first product is a first weighted rule in a fuzzy logic operation.

10. A data processor as in claim 9, further comprises:

means for truncating the first weighted rule.

11. A data processor as in claim 10, wherein the first rule value is an N-bit value and the first weight value is an N-bit value and the truncated first weighted rule is an N-bit value.

12. A fuzzy logic processing system, comprising: p1 a data processor for performing fuzzy logic operations to convert parametric inputs into decision outputs;

first means for fuzzifying said parametric inputs into fuzzy inputs;

second cleans for performing rule evaluation on the fuzzy inputs, the second means comprising:

third means for assigning weight values to rule strengths associated with the fuzzy inputs; and 6 fourth means for increasing the assigned weight values and applying the increased assigned weight values to the rule strengths to produce fuzzy ouputs;

fifth means for abridging the fuzzy outputs; and sixth means for making output decisions based on the abridged fuzzy outputs.

* * * * *